United States Patent [19]

Meckler

[11] 4,328,677
[45] May 11, 1982

[54] PELTIER FREEZE CONCENTRATION PROCESS

[76] Inventor: Milton Meckler, 16348 Tupper St., Sepulveda, Calif. 91343

[21] Appl. No.: 189,918

[22] Filed: Sep. 23, 1980

[51] Int. Cl.³ .............................................. B01D 9/04
[52] U.S. Cl. ........................................ 62/124; 62/537;
62/542; 62/3; 62/485; 62/506; 62/332
[58] Field of Search ................... 62/3, 537, 123, 124,
62/542, 485, 506, 332

[56] References Cited

U.S. PATENT DOCUMENTS

| | | | |
|---|---|---|---|
| 3,212,999 | 10/1965 | Sommers, Jr. ........................ | 62/3 |
| 3,501,924 | 3/1970 | Ashley ................................... | 62/537 |
| 3,664,145 | 5/1972 | Johnson ................................. | 62/537 |

Primary Examiner—Norman Yudkoff
Attorney, Agent, or Firm—William H. Maxwell

[57] ABSTRACT

The treatment of dilute solutions and freeze concentrations thereof by means of steam jet refrigeration pre-cooling of a feed solution sprayed into an absorber-freezer means in which heat is absorbed from the jet refrigeration and from which ice slurry is charged into a melter-worker means discharging product melt and concentrated by-product, and super-cooled by vapor compression refrigeration wherein the refrigerant is simultaneously condensed and chilled by the steam jet refrigeration for pre-cooling the feed solution, steam power therefor being supplied by the Peltier effect in a diffusion still separating water and concentrated refrigerant.

17 Claims, 2 Drawing Figures

PELTIER FREEZE CONCENTRATION PROCESS

BACKGROUND

The distillation of alcohol from grains and the like produces dilute liquid solutions that are rich in energy producing materials referred to as Distillers Dried Grains and Solubles or "DDGS", which is the main by-product of alcohol production. As a by-product commodity, it is required that DDGS be produced and sold in a dry state or condition, for example as bulk feed to be used in animal husbandry. Characteristically and based for example upon corn, DDGS is 92% dry substance, 28–31% raw protein, 12–13% raw fat, 10% raw fibers, 5–6% ash, and 41–43% Nitrogen free extract. For example, in the manufacture of Ethanol, the following feed stocks can be used:

Wheat
Corn
Rice
Sugar

Accordingly, the Peltier Freeze Concentration Process of this invention is not to be limited to the material processed, whether it be the purification of a primary fluid such as sea and/or brackish water, or other inorganic and organic solutions refining concentrations such as DDGS. For purpose of example, the approximate temperatures recited herein are for desalination of sea water.

The state of the art has employed the process of Absorption Freezing Vapor Compression for the concentration of sea water or brackish water. The process referred to is a vacuum freezing process in which the freezing is accomplished in a stirred tank crystallizer due to the evaporation of water vapor which in turn is absorbed in an adjacent chamber by a concentrated solution of sodium chloride (NaCl) diluted by the water vapor pumped to a compressor where it is concentrated to its original strength by vapor compression apparatus using a closed circuit. It is this vapor compression which is replaced in the present invention by the Peltier Multi-effect Process as it is hereinafter disclosed.

The generator means G or absorbent concentrator employed herein is a Peltier Effect Diffusion Still or PEDS, an electrically operated regenerator that drives water from the absorbent in solution therewith. In practice, Sodium Chloride, Calcium Chloride, or Lithium Bromide or the like is the absorbent. In general terms the generator is a thermoelectric still which includes a series of concentric endless walled sections which sections are closely spaced and between which a series of thermoelectric elements are positioned as heat pumps. Means are provided for the passage of distillate along the radially outer surface of each of the concentric sections. Water vapor is diffused from the thin film of liquid passing along the outer surface of each section, across a narrow gap or endless space to the inner surface of the next adjacent concentric section which serves as a condensing surface. The heat for the diffusion of the water vapor at a predetermined constant temperature is provided by thermoelectric heat pumping from the first concentric section relative to the axis of the apparatus in series radially outward to the most distant section from the axis. Diffusing water vapor is thus evaporated and condensed respectively from one section to another requiring only the current necessary to pass the heat flux from the inner to the outer surface. Means are provided for removing the distillate from the inner surface of the concentrator sections and the effluent strong absorbent water from the outer surface of the respective concentric sections. Reference is made to the structure of such Peltier Effect Concentric Still as it is disclosed in my U.S. Pat. No. 3,393,130 dated July 16, 1968, and in my subsequent U.S. Pat. Nos. 3,671,404 dated June 20, 1972 and 3,801,284 dated Apr. 2, 1974.

In order to achieve the temperature differential between the evaporating surface and condensing surface of the apparatus, a thermoelectric heat pump is utilized in the form of thermoelectric elements known to the art and described in texts as "Semiconductor Thermo-elements and Thermoelectric Cooling" by A. F. Ioffe, Infor Search, Ltd., 1957; and in various patents such as U.S. Pat. No. 2,959,017 Gilman, et al., "Heat Exchangers Employing Thermoelectric Elements for Heat Pumping", issued Nov. 9, 1960, and U.S. Pat. No. 2,978,875, Lackey, et al., Plural Stage Thermoelectric heat pump is a device utilizing Peltier phenomenon of heat absorption and heat dissipation at junctions between bodies having different thermomotive properties, which phenomenon occurs when electric current is passed through the bodies. A number of junctions are coupled and generally employed in a heat pump of this type, the couples being physically and electrically interconnected to form a thermoelectric array. A thermoelectric element of the type employed in connection with the present invention typically comprises an N-type thermoelectric element and a P-type thermoelectric element. The N- and P-type components are made from semiconductor materials used in thermocouples. An example of N-type material is an alloy of bismuth-telluride and bismuth-selenide having a formula of 75% $Bi_2Te_3$-25% $Bi_2Se_3$. An example of P-type material is an alloy of bismuth-telluride and antimony-telluride having the formula 25% of $Bi_2Te_3$-75% $Sb_3Te_3$. Semiconductive components including antimony and bismuth have been found suitable for use respectively as P- and N-type materials. Such materials or the formation of thermoelectric pumping elements are not claimed as novel per se in the present invention, but an example will be set forth of the type of such element employed in connection with the apparatus of the present invention.

In accordance with the present invention, a Peltier still simultaneously supplies a steam-jet refrigeration means R and an absorber-freezer means A, taking the latent heat associated with absorption and regenerating the absorbent fluid (NaCl) refrigerant to its original strength and producing high pressure steam. The concentration of sodium chloride permits operation at a temperature above the temperature level in the absorber section of the absorber-freezer means. The use of sodium chloride absorbent also eliminates contamination of the absorbent with the primary fluid being processed, especially when said primary fluid is sea water which is largely NaCl. It is to be understood that the absorbent fluid can vary and be chosen for its compatability with the primary fluid being processed, all as circumstances require.

It is a general object of this invention to usefully employ the effects produced by a Peltier still, namely the simultaneous production of pressurized steam and strengthened absorbent. Accordingly, these effects are advantageously employed in the combined operations of a steam-jet refrigeration means and of an absorber-freezer means. A primary absorbent fluid (NaCl) flows in a closed circuit between the Peltier still and the absorber section of the absorber-freezer means; and a secondary heat transfer fluid (NaCl) flows in a closed circuit between the steam-jet refrigeration means and the input of dilute feed solution into the freezer section of the absorber-freezer means. A feature is the complementary refrigeration of heat transfer fluid (NaCl) by the steam-jet refrigeration means and by the absorber section of the absorber-freezer means, pumped through parallel closed circuits and passed through a pre-cooler means C that lowers the temperature of the dilute feed solution near to freezing. Accordingly, the dilute feed solution is in optimum condition for processing in the freezer section of said absorber-freezer means.

The steam jet refrigeration means R employed herein is a fluid pressure apparatus that operates through the application thereto of primary high pressure steam used to energize an ejector that induces a secondary fluid in the form of vapor drawn from an evaporation chamber. The primary motive steam is expanded through a converging-diverging nozzle to velocities of the order of 1200 meters per second (4000 fps.). The corresponding nozzle pressure is very high, and the high velocity steam issuing from the nozzle entrains the water vapor leaving the suction-evaporation chamber, and the two streams merge in a mixing section that converges in the direction of flow. Such an arrangement is diagrammed in the drawings. Heat transfer fluid return is sprayed into the evaporator chamber and the chilled heat transfer fluid is withdrawn therefrom and utilized for heat transfer in a pre-cooler C as shown herein. The absorber and freezer are combined in the absorber-freezer means A which involves one vessel to eliminate the cumbersome equipment required to handle large volumes of low pressure fluids. The warmer absorbent prevents the build-up of ice on the upper surfaces of the freezer section, thus eliminating problems associated with prior art vacuum freezing processes. The dilute feed solution is agitated by rotating nozzles which throws said solution into the chamber thereby producing a large area for heat transfer. This same action is used to wash the walls of the freezer section so that ice does not accumulate thereon and so that the ice slurry drops to the bottom of the vessel chamber for discharge to the melter-washer means W.

A slurry of iced product is produced in the freezer section of the absorber-freezer means A, and which is drawn off and pumped to a melter-washer means W where the iced product portion thereof is scraped off the top of the wash column and falls into an annulus chamber that surrounds said column where it is melted by the exhaust steam from the aforesaid steam-jet refrigeration means. Discharge of the melt is at 34° F. through a heat exchanger E2 absorbing heat from the incoming feed of dilute solution; while discharge of concentrated by-product solution, such as brine in the case of desalination, is at 26° F. which is pumped off for further processing; for subsequent compaction into solid form when the product is DDGS as hereinabove stated.

Preliminary to conducting the process herein disclosed, the dilute feed solution is deaerated by means D wherein the oxygen content is lowered to about 1 ppm removing about 85% of the air contained therein. This reduces corrosion, and drastically reduces size and power consumption of the air vessel system that would be required if the air had to be removed from a pressure of 3.3 mm Hg in the freezer section of the absorber vs 18 mm Hg in the aerator means. (values are approximate)

It is an object of this invention to advantageously combine and relate the aforementioned means G, R, A, and W with related means as shown, whereby the aforesaid refining process is made possible as circumstances require. Operation of the generator means G is dependent upon a D.C. power supply and made effective by a feed water supply of weak absorbent continuously pumped thereto. Operation of the steam-jet refrigeration means R is dependent upon the high temperature-high pressure output of said generator, and relies upon the melter-washer means W and a condenser means K1 to reduce temperature and pressure before recirculation with the absorbent into the generator means G. And, the absorber-freezer means A is interdependent upon the output of each of said means G, R and a pre-cooler means C. The slurry output from the absorber-freezer means A is pumped into the wash column of the melter-washer means W where the product ice floats to the melter section and is skimmed off and subjected to the exhaust steam from the steam-jet refrigeration means R. The wash column and melter section of means W discharges product and by-product via separate discharge lines.

Two forms of invention are shown herein, the basic low temperature multi-effect system of FIG. 1 involving primary and secondary refrigerant fluids such as sodium chloride (NaCl), and a lower temperature vapor compression system of FIG. 12 which involves a third refrigerant fluid such as ammonia ($NH_3$) in a cascading combination that lowers operational temperature in cases where the circumstances require it. It is an object therefore, to further lower product processing temperature by sharing the steam produced by the aforesaid Peltier generator means G in order to operate both the steam jet refrigeration means R and a closed circuit mechanical refrigeration means such as a turbine driven compression system with ammonia ($NH_3$) as the refrigerant. In practice, part of the steam produced by the generator means G powers an expansion turbine T that operates a compressor means L, with heat of compression removed from the ammonia by the aforesaid secondary refrigerant (NaCl), and all of which chills and increases the subsequent cooling effect of the ammonia and eliminates the usual necessity of a cooling tower. Accordingly, the compressed ammonia is passed through a condenser where it is chilled by the brine circulation through the steam-jet refrigeration means, said chilled ammonia being discharged through an expansion valve E and passed through the pre-cooler C. Return of gaseous ammonia to the compressor is through a receiver S where it is further cooled by recirculating a portion thereof from the receiver and through the absorber section of the absorber-freezer means A. A continuous supply of coolant removes heat from the cascading third stage ammonia system, thereby providing a combined system of self contained configuration.

SUMMARY OF INVENTION

Peltier effect absorption is conducted in a thermoelectric still that separately discharges high temperature water and strong absorbent liquid. The high pressure water is passed through a flash chamber F for conversion to steam and so as to reduce its temperature and pressure values to those required for the steam-jet refrigeration that follows. The high temperature strong absorbent is passed through a heat exchanger so as to recover heat into the weak absorbent return to the generator means G. The steam-jet refrigeration means discharges high temperature steam that is passed through the melt section of the melter-washer means W and through a condenser means K1 to change its condition to liquid for discharge with product discharge. Chilled heat transfer fluid (NaCl) from the steam-jet refrigeration means R is passed through a closed circuit to the pre-cooler C means for lowering the temperature of dilute feed solution closely to that of freezing. Concentrated absorbent fluid from the generator means G and heat exchanger E1 is passed through the absorber section of the absorber-freezer means A and recirculates in a closed circuit through said heat exchanger E1 for heat recovery and return to said generator means G. The absorber tube bundle in the absorber section of the absorber-freezer means A is in parallel with the aforesaid closed circuit through the pre-cooler means C. For lower operating temperature see FIG. 2 of the drawings, wherein the hot water output of the Peltier generator means G is divided between the steam-jet refrigeration means R and a drive means and preferably a turbine T. The lowering of temperature is by means of cascading with a third low temperature mechanical compression closed circuit system using ammonia ($NH_3$) as the refrigerant and powered by said turbine, and also by lowering the temperature of the ammonia by means of heat exchange from the aforementioned secondary fluid as it is condensed and is cooled by the steam-jet refrigeration means and by the absorber section of the absorber-freezer means A. The system is operational without a cooling tower, as shown. The absorber-freezer means A is thereby made to produce an ice slurry of the dilute feed solution and the melter-washer means W is made to separate product and by-product. In the case of desalination, the product is potable water and the by-product is brine. In the case DDGS production the melt is drawn off and the concentrate is subsequently dehydrated for compaction into nutrient material.

The foregoing and other various objects and features of this invention will be apparent and fully understood from the following detailed description of the typical preferred forms and applications thereof, throughout which description reference is made to the accompanying drawings.

PREFERRED EMBODIMENT

Figure 1:
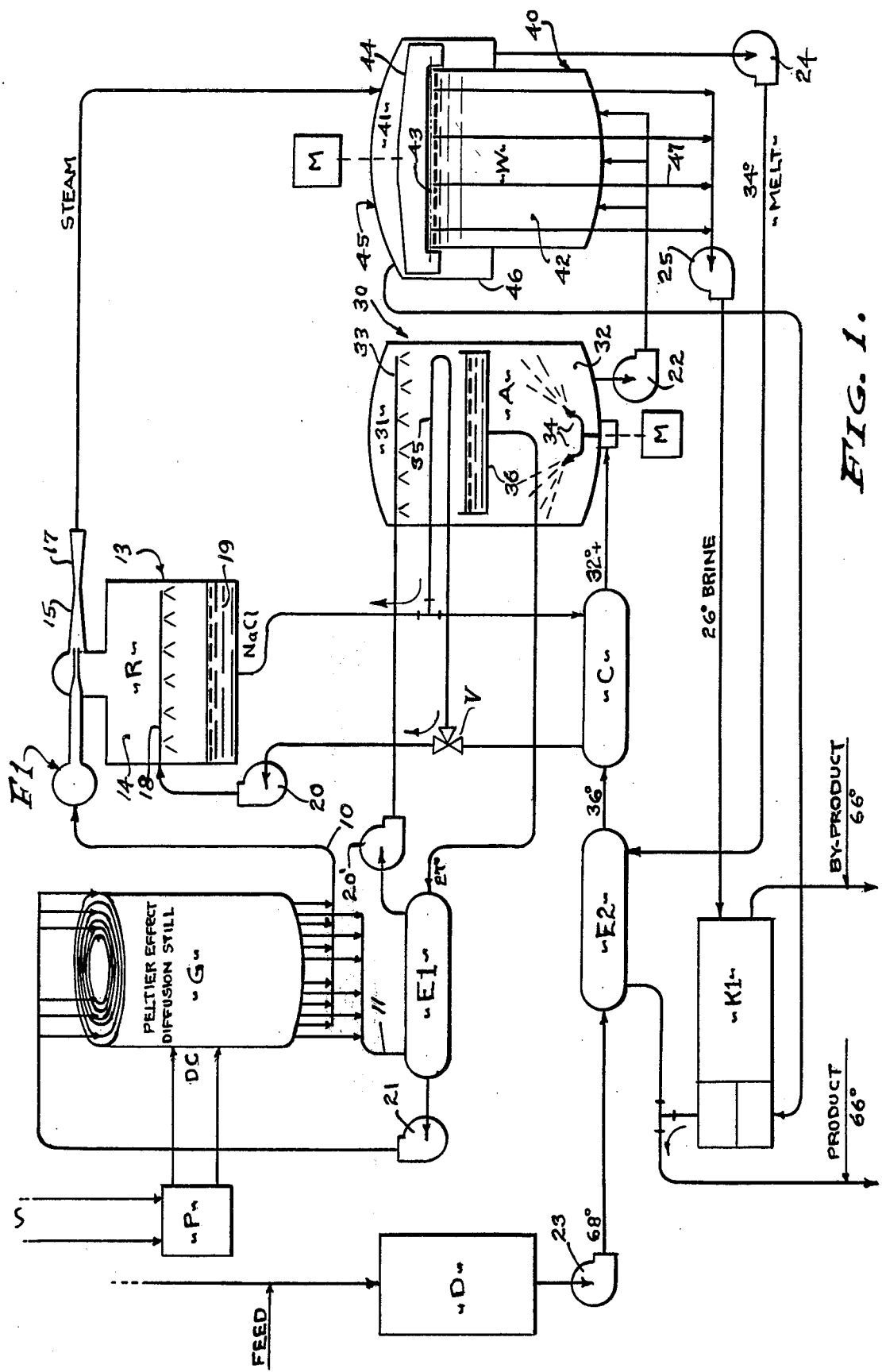
FIG. 1 is a schematic diagram of the basic freeze concentration process wherein primary and secondary refrigeration circuits are employed.

The generator means G is a thermoelectric still that utilizes vapor mass transport in a diffusion process that produces separate discharges of water and strong absorbent refrigerant, both at high to moderate temperature and high to moderate pressure. Thermoelectric principles are employed to cause a fluid to migrate to the cold side of a diffusion gap. The products in the form of water and strong absorbent liquid are removed from the diffusion gap and are discharged separately through lines 10 and 11. The use of thermoelectric elements for heat pumping is well known, involving the phenomenon of heat absorption and heat dissipation at junctions between bodies having different thermo-motive properties, which phenomenon occurs when electric current passes through the bodies. A multiplicity of such junctions are coupled, the couples being physically and electrically interconnected to form an array. A thermoelectric device of this type employed with the present invention comprises an N-type element and a P-type element, both made of a semiconductor material as used in thermocouples. For example, an N-type material such as bismuth-telluride and bismuth-selenide, and a P-type material such as bismuth-telluride and antimony-telluride; designated as P and N to indicate their thermoelectric properties respectively. As shown schematically in the drawings, the generator G is comprised generally of concentric shells connected to positive and negative potentials of a D.C. power source. The shells are arrayed in a pressure vessel (not shown) to channel the distillate water separate from the strong absorbent refrigerant, both at high temperature and high pressure as indicated.

The hot water discharge of the generator means G through line 10 is approximately at 540° F. and at 1000 p.s.i. and which is converted to steam in a flashing means F1, in order to be operative in the steam-jet refrigeration means R next to be described. The flashing means F1 is essentially an expansion chamber wherein the conversion from water to steam occurs with a commensurate pressure and temperature change, and with a discharge of steam at increased velocity.

The strong absorbent refrigerant discharge of the generator means G through line 11 is reduced in temperature by heat exchanger means E1 for discharge into the absorber section of the absorber-freezer A, as will be described.

Referring now to the basic form of this multi-effect system as it is shown in FIG. 1, the steam-jet refrigeration means R is a fluid pressure device that operates according to the flow of steam therethrough at high velocity. The primary motive steam is nozzled into the converging section 15 of a booster ejector, and into which a chilled water vaporization chamber 14 is open from a housing 13. Accordingly, a secondary fluid in the form of vapor is drawn from chamber 14 and into section 15 of the booster ejector, and thereafter discharges through a diverging section 17 of the booster ejector. Thus, the primary motive steam is expanded through the converging-diverging nozzle at high velocity and mixes with the secondary chilled water vapors drawn from chamber 14. The return of a secondary heat transfer fluid (NaCl) through a pre-cooler C is sprayed into the chamber 14 by spray means 18 and that which is not evaporated falls or precipitates by gravity into a sump 19 at the bottom of housing 13 and from which it is drawn by a circulation pump 20 as will be described.

The absorber-freezer means A is preferably a device which employs the Sodium Chloride, Calcium Chloride, or the like—Water Cycle absorption principle of operation wherein a housing 30 has an upper absorber section 31 and a lower freezer section 32, one in open communication with the other. The absorber section 30 is primarily associated with absorption of heat from the strong absorbent refrigerant (NaCl) discharged by line 11 from the generator means G, and is secondarily associated with the secondary heat transfer fluid (NaCl) circulated by a pump 20. The strong absorbent refrigerant from generator means G is cooled by the refrigerant return of weak absorbent (27° F.) from a collecting tray 36 from which it is drawn by a recirculation pump 21.

The strong absorbent refrigerant from generator means G is cooled by a heat exchanger means E1 and is discharged by a pump 20' from a spray bar 33 and into the upper portion of housing 30 chamber where it absorbs heat from an absorber bundle or coils 35, and from the heat which rises from the freezer section 32 of the housing chamber. Chilled refrigerant is returned from a sump trap 36 to pump 20' through a proportioning valve V, the coil 35 being in parallel relation to the circulation of the same refrigerant through the steam-jet refrigeration means R.

The dilute feed solution is discharged from a motor driven rotary nozzle 34 and into the freezer chamber section 32 and thereby presents a large interface area for the heat transfer into the absorber section 31. The rotary nozzle action also washes the side walls of the housing 30 chamber 31-32 so that ice accumulation is prevented. An ice slurry of product materials then falls or precipitates to the bottom of the housing 30 section 32 where it is drawn off by a pump 22 that delivers the slurry to the melter-washer means W.

The freezer section 32 of the absorber-freezer means A is primarily associated with the absorption of heat from the dilute feed solution that enters the housing 30 chamber 31-32 through the pre-cooler means C. As shown, the pre-cooler means lowers the feed temperature near to freezing, for example to 32° F.+. In practice, heat recovery from the dilute feed solution at 68° F. through feed pump 23 is reduced to 36° F. by the melt liquid product at 34° F. discharged through a heat exchanger means E2 to 66° F. (approximate temperatures). Thus, the preparation of dilute feed solution for freezing in the chamber 32 is by means of heat exchange from the discharge of product melt, and by series treatment by means of pre-cooling with heat transfer refrigerant (NaCl) supplied through the parallel arrangement of the steam-jet refrigeration means R and the absorber bundle-coils 35 in section 31 of the absorber-freezer means A.

The deaerator means D is provided to remove substantially all air from the incoming feed solution, thereby reducing the oxygen content with a commensurate reduction of corrosion. This deaeration is performed at or ahead of the feed pump 23 where air is easily removed. This also minimizes the size and power requirements of the deaeration means D. Accordingly, the deaerator means D is placed at or ahead of the feed pump 23, operating at ambient pressures and temperatures.

In accordance with this invention, the melter-washer means W is combined with the aforesaid means so as to refine the incoming dilute feed solution by separating the product melt from the by-product concentrate, for example by removing the DDGS materials after the production of alcohols and the like. The extraction of heat is from the effects of the aforesaid Peltier still generator means G as it is combined with the steam-jet refrigeration means R and the absorber-freezer means A. It is significant that said means R and A separately absorb heat and are arranged in parallel relation to pre-cool the dilute feed solution to near freezing. The recirculation of the primary strong to weak absorbent (NaCl) is confined to the Peltier still and to the upper absorber section 30 of the absorber-freezer means A; while the recirculation of the secondary heat transfer fluid (NaCl) is confined to the chamber 14 and sump 19 of the steam-jet refrigeration means R, and to the absorber bundle-coils 35 which operate in parallel through the pre-cooler means C. The steam-jet booster ejector 15-17 exhaust is employed at the melter section 41 of the melter-washer means W, following which the remaining steam exhaust passes through the condenser means K1 and is returned to liquid form for discharge with the product melt. The by-product brine is shown to discharge through the condenser means K1 for heat exchange and to raise the by-product discharge to an ambient temperature for subsequent handling.

The melter-washer means W involves a housing 40 of circular formation establishing a vertically disposed wash column 42 into which the product ice slurry is discharged to rise to a floatation level 43, a lip or wier, where a motor driven skimmer 44 operates in a horizontal plane to cause radial discharge of ice slurry accumulation at the surface level 43. A shell 45 covers the top of the housing 40 and surrounds the same with a depending skirt 46 that forms an annular melt chamber through which the exhaust steam from the booster ejector 15-17 is passed to thereby melt the product ice. A pump 24 discharges the product melt through the heat exchanger means E2 which lowers the dilute feed solution from 68° F. to 36° F. and simultaneously raises the product discharge from 34° F. to an ambient 68° F., for example. By-product discharge tubes 47 extend to the surface level 43 and through which the concentrated product or brine drops from the melter section 42 and out of the bottom of the housing 40, to be removed by a pump 25 for discharge through the condenser means K1 which lowers the temperature of remaining exhaust steam and simultaneously raises the by-product discharge to an ambient 68° F., for example.

Figure 2:
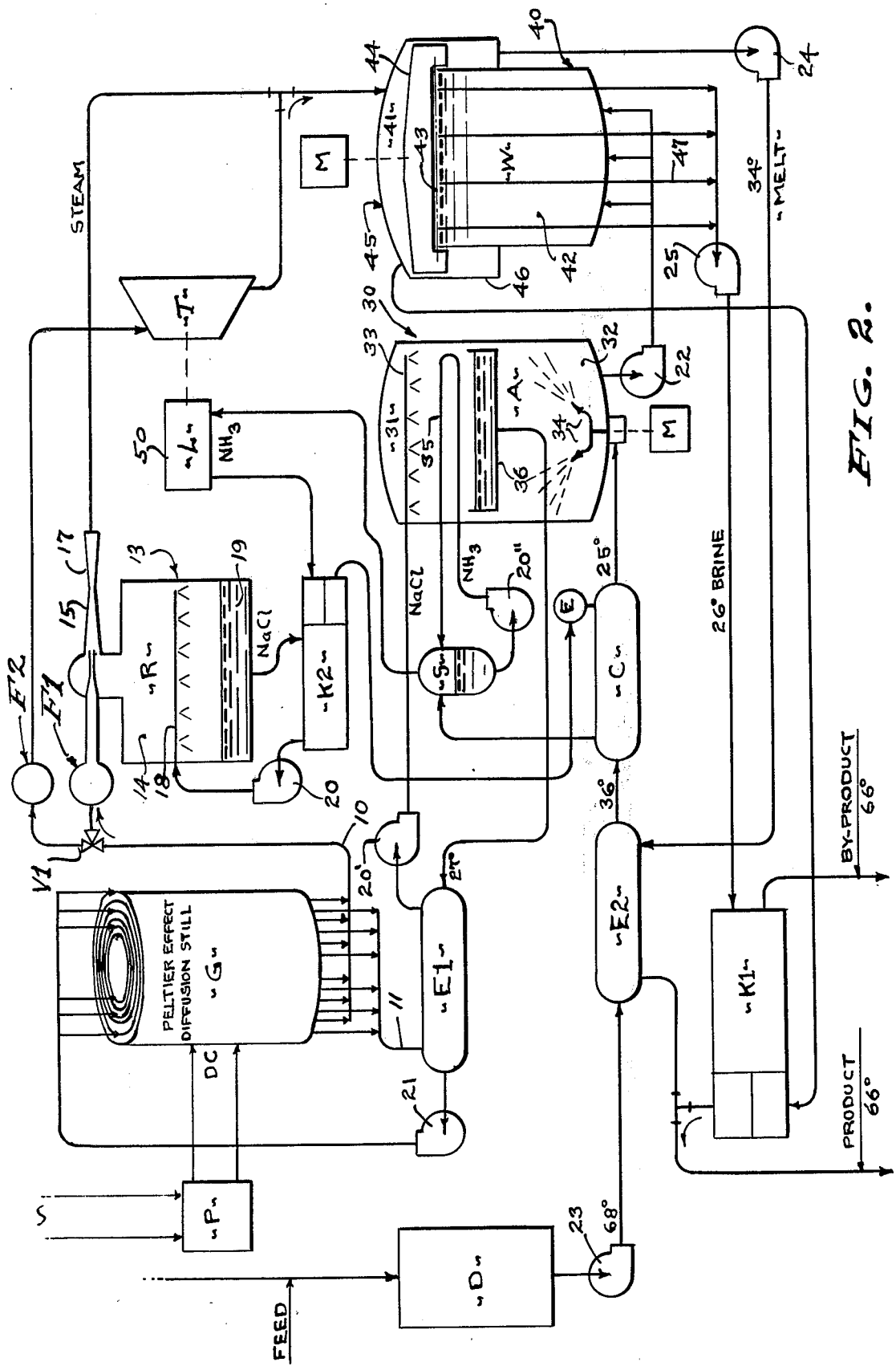
FIG. 2 is a schematic diagram similar to FIG. 1 and is of the lower temperature freeze concentration process wherein a third refrigeration circuit is employed.

Referring now to the second form of this invention shown in FIG. 2 of the drawings, there is a cascading effect made possible by combining a third closed circuit refrigeration means with the primary and secondary refrigeration circuits above described. As shown in FIG. 2, the basic system of FIG. 1 remains as it is disclosed herein, and a third means of refrigeration in the form of a turbine driven ammonia compresser 50 is inserted therein to further lower the pre-cooler C output temperature. Accordingly, the ammonia ($NH_3$) is circulated through the pre-cooler C after it is condensed and the heat of compression removed therefrom by the steam-jet refrigeration means R. To these ends, there is a condenser means K2 through which the ammonia condenses and is chilled with the brine circulated by the pump 20. The chilled ammonia is then expanded from an expansion valve E and passed through the pre-cooler C and to a receiver S for return to the compressor 50 in a gaseous state. A feature is recirculation of liquid ammonia from the receiver S and through the absorber coils 35 by means of a pump 20" for further cooling before compression (50).

As shown in FIG. 2, the hot water discharge of the Peltier generator means G is through a proportioning valve V1 from the line 10 and converted to steam in the flashing means and preferably a separate flashing means F2, in order to be operative in the turbine means T where it is expanded and subsequently entered into the steam exhaust from the steam-jet refrigeration means R as above described. Note that the steam-jet refrigeration means R operates the same as hereinabove described, with spray means 18 and a sump 19 from which the refrigerant (NaCl) is recirculated by pump 20. However, said circulation of secondary refrigerant is through the condenser means K2 for the absorption of heat of compression from the ammonia ($NH_3$) delivered by the compressor means 50 operated by the turbine means T. This third super-cooling closed circuit of ammonia is through the condenser means K2 and thence through the pre-cooler C where it chills the dilute feed solution to a lower temperature such as to 20° F. The discharge of feed solution from the precooler C is to the melter-washer W as above described.

As it is in the basic form of FIG. 1, the strong absorbent from the generator means G is discharged by the pump 20' from a spray bar 33 and into the upper portion of housing 30 chamber where it absorbs heat from the absorber bundle or coils 35. The coils 35 in the system of FIG. 2 are in parallel arrangement with the ammonia compression system through the receiver S that separates liquid and gas, to further cool the ammonia intake to the compressor 50. Thus, the steam that is produced from the flashing means F2 is used to drive the ammonia compressor L, while the steam from flashing means F1 is used for operation of the steam-jet refrigeration system R. The simultaneous operation of the primary and secondary refrigeration circuits is supplemented by the third ammonia compression circuit which is cooled by the two aforesaid circuits, thereby lowering the feed temperature and establishing a self contained system with no need of a cooling tower. As a result, lower temperature of feed solution processing is quickly attained, the combination also results in a compact design of flexibly operational applications to various feed materials, and all of which is simple to operate with a minimum of controls and without complexity.

From the foregoing, it will be seen that this Peltier Freeze Concentration Process has its practical applications, and it is to be understood that it is by far more economical in its applications than Evaporator and/or the aforesaid Absorption Freezing Vapor Compression systems of the prior art. It is energy consumption which is the controlling factor to be considered, and it is by comparing of BTU consumption that the present invention is far superior to multiple effect evaporator systems in consuming for example 10.59 BTU per lb. of water, while a three effect evaporator consumes 402 BTU per lb.; a six effect evaporator consumes 204; and a twelve effect evaporator consumes 105. And, the present invention is even superior to the improved state of the art Absorption Freezing Vapor Compression systems which consume for example 17.17 BTU per lb. of water. Accordingly, a thermodynamic viewpoint re energy is to be understood as it pertains to the Peltier effect Concentration as it is disclosed herein, as follows.

Energy may be supplied to the process described both as heat and as work. For the transfer of energy as heat, differences in temperature are necessary while work includes all those forms of energy in transit which are quantitatively and completely inconvertable. The interaction of energy supplied as work, e.g., pumps, and that supplied as heat, e.g. preheaters, in the operation described permits optimizing the recovery of input energy per pound of distillate produced. The figure of merit (Z) which is the measure of efficiency of a thermoelectric device, represents the most important combination of parameters for a thermoelectric device, and represents the most important combination of parameters for a thermoelectric material. The higher the value of "Z", the lower the energy input necessary to pass one BTU between predetermined hot and cold junction temperature levels. Materials of "Z" equal approximately $3.5 \times 10^{-3}/°C$. are now commercially available and a conserted effort is being made among leading material producers to develope semiconductors which exhibit several times currently available "Z" values.

The present state of the art acknowledges approximately $3.5 \times 10^{-3}/°C$. as the normally accepted Z value, in which case the Peltier Freeze Concentration Process herein disclosed and operating at 10.59 BTU per lb. of water is 38.29% more efficient than the normally acceptable performance of the Absorption Freezing Vapor Compression Process. However, as the state of the art is improving in the metalurgical application to the Peltier effect, it is contemplated and it is expected that the Z value will reach $10 \times 10^{-3}/°C$., in which case the Peltier Freeze Concentration Process herein disclosed and operating at 8.88 BTU per lb. of water will be 48.25% more efficient than the normally acceptable performance of the Absorption Freezing Vapor Compression Process. In other words, with the present day technology, the Peltier Freeze Concentration Process herein disclosed represents approximately a 38% savings in input energy, which can be expected to increase to approximately 48% in the near future.

Electrical to operate the generator means G is made available from two sources, solar panels (not shown) and from commercial power lines as is indicated. The power supply P divides and/or balances the available power, it being understood that direct current is applied to the junctions of the thermo-electric still of generator means G as positive and negative potentials.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A freeze concentration system for separating product and by-product from a dilute feed solution, and including;

a generator means producing and discharging high temperature high pressure motive water separate from a strong primary absorbent refrigerant solution thereof, a means converting said motive water into high temperature steam, a steam jet refrigeration means having a booster ejector operated with said steam and drawing a secondary refrigerant vapor from a chamber and having an exhaust, there being spray means discharging secondary absorbent refrigerant into said chamber for both evaporation and precipitation to a sump therein, an absorber-freezer means having an absorber section with spray means discharging strong solution therein from the generator means for heat absorption and precipitation to a sump tray therein and returned as weak solution to said generator means by circulating means therefor, and having a freezer section with spray means for discharging dilute feed solution therein and to form an ice slurry thereof, a first heat exchanger means transferring heat from the strong absorbent discharge of the generating means and into the weak absorbent return to said generator means, a melter-washer means having a wash column section for the rise of said ice slurry to a floatation level and transferred thereto by a pump means from the absorber-freezer means and with a by-product discharge means, and having a melt section over and surrounding the floatation level to receive the booster-ejector steam exhaust, and with a product melt discharge means, and a pre-cooler means transferring heat from a supply of the dilute feed solution and into the secondary refrigerant thereby chilling said dilute feed solution for discharge through said spray means and into the freezer section of the absorber-freezer means.

2. The freeze concentration system as set forth in claim 1, wherein the generator means is a Peltier Effect Diffusion Still receiving low pressure weak absorbent solution from said circulating means therefor and separately producing said high temperature high pressure motive water and a strong absorbent solution thereof.

3. The freeze concentration system as set forth in claim 1, wherein the generator means is a Peltier Effect Diffusion Still receiving low pressure weak absorbent from said circulating means therefor and separately producing said high temperature high pressure motive water and a strong absorbent solution thereof, and wherein a flashing-separator converts the said high temperature high pressure motive water into high temperature high pressure steam and transfers the same into the booster ejector.

4. The freeze concentration system as set forth in claim 1, wherein the Peltier Effect Diffusion Still is comprised of P and N type thermocouples in an array of shells connected to a direct current electrical power source and arranged within a pressure vessel to channel distillate motive water separate from said strong absorbent solution.

5. The freeze concentration system as set forth in claim 1, wherein the absorber-freezer means has heat transfer coils in the absorber section thereof and in circuit with said secondary absorbent refrigerant discharged through said steam-jet refrigeration means.

6. The freeze concentration system as set forth in claim 1, wherein the absorber-freezer means has heat transfer coils in the absorber section thereof and connected in parallel circuit through a proportioning valve into said secondary absorbent refrigerant discharged through said steam-jet refrigeration means.

7. The freeze concentration system as set forth in claim 1, wherein a third closed circuit vapor compression refrigeration means transfers heat from the supply of dilute feed solution and into the secondary refrigerant thereby super chilling the said dilute feed solution for discharge through said spray means and into the freezer section of the absorber-freezer means.

8. The freeze concentration system as set forth in claim 1, wherein a third closed circuit vapor compression refrigeration means passes compressed refrigerant through a condenser means transferring heat into the secondary refrigerant and subsequently through an expansion valve and through the pre-cooler means for transfer of heat from the supply of dilute feed solution thereby super chilling the said dilute feed solution for discharge through said spray means and into the freezer section of the absorber-freezer means.

9. The freeze concentration system as set forth in claim 1, wherein a third closed circuit vapor compression refrigeration means transfers heat from the supply of dilute feed solution and into the secondary refrigerant thereby super chilling the said dilute feed solution for discharge into said absorber-freezer means, and wherein the absorber-freezer means has heat transfer coils in the absorber section thereof and in circuit with the third closed circuit vapor compression refrigeration means to transfer heat therefrom.

10. The freeze concentration system as set forth in claim 1, wherein a third closed circuit vapor compression refrigeration means passes compressed refrigerant through a condenser means transferring heat into the secondary refrigerant and subsequently through an expansion valve and through the pre-cooler means for transfer of heat from the supply of dilute feed solution thereby super chilling the said dilute feed solution for discharge through said spray means and into the freezer section of the absorber-freezer means, and wherein the absorber-freezer means has heat transfer coils in the absorber section thereof and in circuit by pump means through a liquid section of a receiver in circuit through a gaseous section of said receiver and with the third closed circuit vapor compression refrigeration means to transfer heat therefrom.

11. The freeze concentration system as set forth in any one of claims 7 through 10, wherein the high temperature steam is separated and the steam-jet refrigeration means and the vapor compression refrigeration means operated independently therefrom.

12. The freeze concentration system as set forth in any one of claims 7 through 10, wherein the high temperature steam is separated and the steam-jet refrigeration means and the vapor compression refrigeration means operated independently therefrom, and wherein the vapor compression refrigeration means has steam expansion drive means with an exhaust into the melt section of the melter-washer means.

13. The freeze concentration system as set forth in any one of claims 7 through 10, wherein at least one flashing-separator converts the high temperature high pressure motive water from the generator means into high temperature high pressure steam transferred separately to and to operate the steam-jet refrigeration means and the vapor compression refrigeration means respectively.

14. The freeze concentration system as set forth in any one of claims 7 through 10, wherein at least one flashing-separator converts high temperature high pressure water from the generator means into high temperature high pressure steam transferred separately to operate the steam-jet refrigeration means and the vapor compression refrigeration means respectively, and wherein the vapor compression refrigeration means has steam expansion drive means with an exhaust into the melt section of the melter-washer means.

15. The freeze concentration system as set forth in any one of claims 1 through 10, wherein the product melt discharge from the melt section of the melter-washer means is through a heat exchanger in series relation with the pre-cooler means to transfer heat from the dilute feed solution.

16. The freeze concentration system as set forth in any one of claims 1 through 10, wherein the by-product discharge from the washer section of the melter-washer means is through a condenser transferring heat into an exhaust steam discharge from the melter section of the melter-washer means, said condensed steam being connected into the product discharge.

17. The freeze concentration system as set forth in any one of claims 1 through 10, wherein the product melt discharge from the melt section of the melter-washer means is through a heat exchanger in series relation with the pre-cooler means to transfer heat from the dilute feed solution, and wherein the by-product discharge from the washer section of the melter-washer means is through a condenser transferring heat into an exhaust steam discharge from the melter section of the melter-washer means, said condensed steam being connected into the product discharge.

* * * * *